United States Patent
Gusler et al.

(10) Patent No.: US 6,931,422 B1
(45) Date of Patent: Aug. 16, 2005

(54) ENHANCED BACKUP AND RECOVERY METHODOLOGY

(75) Inventors: Carl Phillip Gusler, Austin, TX (US); Rick A. Hamilton, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,054

(22) Filed: Nov. 12, 1999

(51) Int. Cl.[7] ............................................. G06F 17/30
(52) U.S. Cl. ..................................... 707/204; 707/202
(58) Field of Search ............................... 707/200–205; 711/162, 118, 4; 714/6

(56) References Cited

U.S. PATENT DOCUMENTS

| | | | | |
|---|---|---|---|---|
| 5,276,865 A | * | 1/1994 | Thorpe | 713/330 |
| 5,539,905 A | * | 7/1996 | Nissato | 707/8 |
| 5,664,186 A | * | 9/1997 | Bennett et al. | 707/204 |
| 5,684,989 A | * | 11/1997 | Nissato | 707/104.1 |
| 5,751,997 A | | 5/1998 | Kullick et al. | 395/489 |
| 5,765,173 A | * | 6/1998 | Cane et al. | 707/101 |
| 5,778,395 A | * | 7/1998 | Whiting et al. | 707/10 |
| 5,930,824 A | * | 7/1999 | Anglin et al. | 711/162 |
| 5,966,730 A | * | 10/1999 | Zulch | 707/202 |
| 6,026,414 A | * | 2/2000 | Anglin | 707/10 |
| 6,035,412 A | * | 3/2000 | Tamer et al. | 707/204 |
| 6,047,294 A | * | 4/2000 | Deshayes et al. | 707/202 |
| 6,119,212 A | * | 9/2000 | Gross et al. | 711/173 |
| 6,163,148 A | * | 12/2000 | Takada et al. | 180/206 |
| 6,248,065 B1 | * | 6/2001 | Brown | 600/300 |
| 6,260,069 B1 | * | 7/2001 | Anglin | 707/204 |
| 6,684,229 B1 | * | 1/2004 | Luong et al. | 707/204 |

* cited by examiner

*Primary Examiner*—Greta Robinson
*Assistant Examiner*—Debbie M. Le
(74) *Attorney, Agent, or Firm*—Duke W. Yee; David A. Mims, Jr.; Lisa L. B. Yociss

(57) ABSTRACT

Initially, a table file is built which lists at least filesystems to be backed up. It also may list the type of backup techniques to be used for a specific filesystem, the filesystem's logical location, and the number of copies to be made. The table file is checked for syntax and is then available for other routines. An automated script may be used for building the table, and then it may be manually edited if necessary. Other scripts may be invoked for backing up the filesystems listed in the script by accessing the table file.

34 Claims, 51 Drawing Sheets

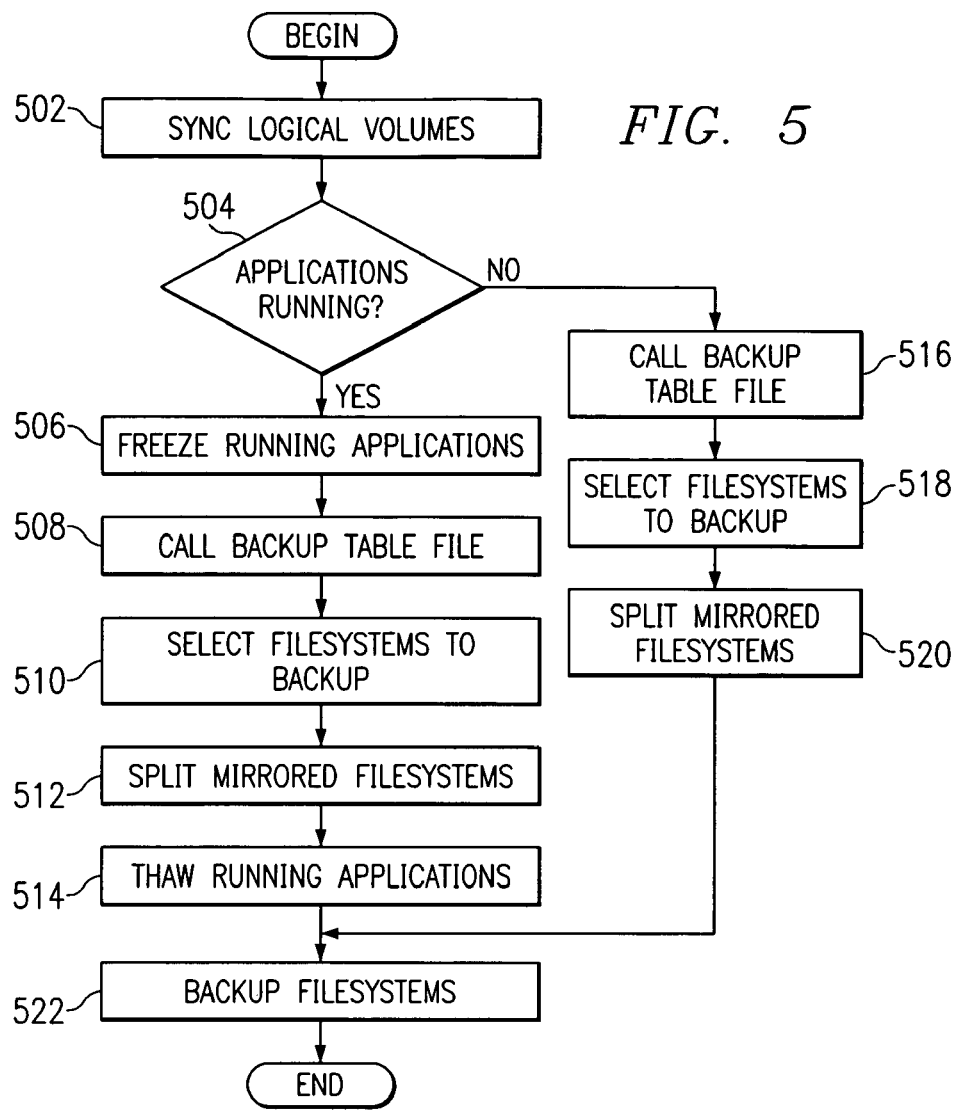

```
#!/bin/ksh
##########################################################################

# fscpbtab_unlock.ksh
#               Version 0.01
#                       Runs various AIX commands to remove lock on
#                         the FSCPBK table file
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

##########################################################################
#--------------------------------

Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

FIG. 7A

```
This program is distributed on an "as is" basis,
no warranty is expressed or implied.

#----------------------------------------

#----------------------------------------

# Description: Removes lock on /etc/fscpbktab table file.
#              A cleanup utility for problem times with FSCPBK scripts
# Operational Environment: AIX V4
# Input:
# Output:
# Return Value:
# Comments: NOTE!!: This script is an excerpt of the fscpbk_back.ksh
script. If that script is edited, this one
should probably be edited to match.

#----------------------------------------

#----------------------------------------

# Version History: None

#----------------------------------------

#----------------------------------------

# Environmental Variables

#----------------------------------------
# Constants
bar='================================================
'
wire='=--------------------------------------'

Variables
numeric_date=$(date +%m%d
text_date=$(date +%d%b%Y)
typeset -i return_code             %y)
typeset -i merge_return_code
typeset -i retain_days=90
typeset -i in_retain_days
typeset -i copies
typeset -i ncrement
typeset -i mount_fs_test
invoked_name=$0
script_name=${invoked_name##*/}
user_id=$(whoami)
desc='ADSM Archive at'$text_date
level=0
```

*FIG. 7B*

```
# Process Control Variables
l_flag=0
L_flag=0
r_flag=0
d_flag=0

Files default_log_dir=/var/adm/scriptlogs
default_log_file=$script_name.$text_date
default_backup_device=/dev/rmt0.1
work_file1=/tmp/$script_name.$text_date.work1
work_file2=/tmp/$script_name.$text_date.work2
config_file=/etc/fscpbktab
audit_file=/etc/fscpbktab.audit
lock_file=/var/locks/fscpbktab

#--------------------------------------

# Function: show_usage
Description: Displays command usage syntax and exits
Input: None
Output: Usage message to standard error
Return Value: 2
Note: This function does not return. It completely exits.

#--------------------------------------
show_usage ()
{
   print -u2 "         "
   print -u2 "Usage: fscpbktab_unlock.ksh [-l directory] [-r days] "
   print -u2 "         "
   print -u2 "    -l directory  Log output directory."
   print -u2 "              Default is" $default_log_dir
   print -u2 "         "
   print -u2 "    -r days   Log retention period."
   print -u2 "              Default is" $retain_days
   print -u2 "         "
   exit 2
}

#--------------------------------------

# Korn Shell Settings

#--------------------------------------
#set -o errexit    # Turn on error trapping and error exit mode
#set -o noclobber  # Prevent overwriting of existing files
#set -o noexec     # Perform syntax checking without execution
#set -o nolog      # Prevents storing function defs in history file
```

```
#set -o xtrace     # Turn on debug mode

#-------------------------------------------

# Main Routine

#-------------------------------------------

# Test for any passed parameters.
#if [ $? != 0 ]
#then
show_usage
fi

log_dir=$default_log_dir
# Parse Command Line Arguments into Variables
while getopts l:r# c
do
   case $c in
   l) # Set up the -l flag
      l_flag=1
      log_dir=$OPTARG;;
   r) # Set up the -r flag
      r_flag=1
      in_retain_days=$OPTARG;;
   :) show_usage;;
   \?) show_usage;;
   esac
done
shift $((OPTIND-1))

Deal with invocation errors
if [[ $user_id != root ]]; then
    show_usage
fi

# Configure Logging
if [[ $l_flag -eq 1 ]]; then
    log_file=$in_log_dir/$default_log_file
    mkdir -p $in_log_dir 2>/dev/null   #Create new log directory
else
    log_file=$default_log_dir/$default_log_file
    mkdir -p $default_log_dir 2>/dev/null # Create default log directory
fi if [[ $r_flag -eq 1 ]]; then
  retain_days=$in_retain_days
fi
```

```
# Clear old logs
find $log_dir -name "$script_name*" -mtime $retain_days -exec rm {}\;

# Create new log file
exec 3>> $log_file # Open log file for writing print -u3 "\n================================================="
print -u3 "=                                                ="
print -u3 "= Systems Management Transaction Log             ="
print -u3 "=                                                ="
print -u3 "=   Created by script:" $script_name
print -u3 "=       on system:" $(hostname)
print -u3 "=       at     :" $(date)
print -u3 "=                                                ="
print -u3 "================================================="

# Perform Work
#   Comments: NOTE!!: This script is an excerpt of the fscpbk_back.ksh
script. If that script is edited, this one
should probably be edited to match.

Test for existing table file
if [[ ! (-r $config_file) ]]; then
    print -u2 "Fatal Table error. Table file" $config_file "not found."
    print -u3 "Fatal Table error. Table file" $config_file "not found."
    exec 3<&-
    exit 99
fi

Unlock table file chmod 644 $config_file
rm $lock_file 2>> $log_file exec 3<&- exit 0
```

FIG. 7E

```
#!/bin/ksh
######################################################################

# fscpbktab_build.ksh
#              Version 0.33
#                       Runs various AIX commands to build
#                         table of filesystems to backup
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

######################################################################

#------------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

FIG. 8A

```
This program is distributed on an "as is" basis,
no warranty is expressed or implied.

#------------------------------------

#------------------------------------

# Description: Builds table file for other scripts in FSCPBK package.
# Operational Environment: AIX V4 and ADSM V3.1
# Input:
# Output:
# Return Value:
# Comments:

#------------------------------------

#------------------------------------

# Version History: None

#------------------------------------

#------------------------------------

# Environmental Variables

#------------------------------------
# Constants
bar='==================================================' wire='=--------------------------------'

Variables
numeric_date=$(date +%Y%m%d%H%M)
text_date=$(date +%d%b%Y)
typeset -i return_code
typeset -i retain_days=10
typeset -i in_retain_days
typeset -i copies
typeset -i ncrement
typeset -i return_code
invoked_name=$0
script_name=${invoked_name##*\}
user_id=$(whoami)

# Process Control Variables
L_flag=0
L_flag=0
r_flag=0
```

FIG. 8B

```
Files
default_log_dir=/var/adm/scriptlogs
default_log_file=$script_name.$text_date
work_file1=/tmp/$script_name.$text_date.work1
work_file2=/tmp/$script_name.$text_date.work2
config_file=/etc/fscpbktab
lock_file=/var/locks/fscpbktab

#-----------------------------------------

# Function: show_usage
Description: Displays command usage syntax and exits
Input: None
Output: Usage message to standard error
Return Value: 2
Note: This function does not return. It completely exits.

#-----------------------------------------
show_usage ()
{
    print -u2 "          "
    print -u2 "Usage: fscpbktab_build.ksh [-l directory] [-r days] "
    print -u2 "          "
    print -u2 "     -l directory   Log output directory."
    print -u2 "                    Default is" $default_log_dir
    print -u2 "          "
    print -u2 "     -r days   Log retention period."
    print -u2 "                    Default is" $retain_days
    print -u2 "          "
    exit 2
}

#-----------------------------------------

# Korn Shell Settings

#-----------------------------------------
#set -o errexit    # Turn on error trapping and error exit mode
#set -o noclobber  # Prevent overwriting of existing files
#set -o noexec     # Perform syntax checking without execution
#set -o nolog      # Prevents storing function defs in history file
#set -o xtrace     # Turn on debug mode

#-----------------------------------------

# Main Routine

#-----------------------------------------
```

```

# Test for any passed parameters.
#if [ $? != 0 ]
#then
show_usage
fi
log_dir=$default_log_dir
# Parse Command Line Arguments into Variables
while getopts a:l:p:r# c
do
   case $c in
   l)    # Set up the -l flag
         l_flag=1
         log_dir=$OPTARG;;
   r)    # Set up the -r flag
         r_flag=1
         in_retain_days=$OPTARG;;
   :)    show_usage;;
   \?)   show_usage;;
   esac
done
shift $((OPTIND-1))

Deal with invocation errors
if [[ $user_id != root ]]; then
    show_usage
fi

# Configure Logging
if [[ $l_flag -eq 1 ]]; then
    log_file=$in_log_dir/$default_log_file
    mkdir -p $in_log_dir 2>/dev/null   #Create new log directory
else
    log_file=$default_log_dir/$default_log_file
    mkdir -p $default_log_dir 2>/dev/null # Create default log directory
fi if [[ $r_flag -eq 1 ]]; then
    retain_days=$in_retain_days
fi

# Clear old logs
find $log_dir -name "$script_name*" -mtime $retain_days -exec rm {}\;

# Create new log file
exec 3>> $log_file # Open log file for writing
```

```
print -u3 "\n=================================================="
print -u3 "=                                                ="
print -u3 "= Systems Management Transaction Log             ="
print -u3 "=                                                ="
print -u3 "= Created by script:" $script_name
print -u3 "=      on system:" $(hostname)
print -u3 "=      at    :" $(date)
print -u3 "=                                                ="
print -u3 "=================================================="

Perform Work

# Test for locked table file and exit
if [[ -f $lock_file ]]; then
    print -u2 "Table file is currently in use and locked."
    print -u3 "Table file is currently in use and locked."
    exec 3<&-
    exit 96
fi

# Test for existing table file and save
if [[ -r $config_file ]]; then
    mv $config_file $config_file.old.$text_date
fi

# Create new tab file
exec 4> $config_file # Open table file for writing
#print -u4 "#:"$(date +%Y%m%d%H%M")":"=========================="
print -u4 "#=============================================="
print -u4 "#                                             ="
print -u4 "# Filesystem Backup Selection Table file      ="
print -u4 "#                                             ="
print -u4 "#   Format: bc:pfs:plv:c:afs:alv              ="
print -u4 "#                                             ="
print -u4 "#       or                                    ="
print -u4 "#                                             ="
print -u4 "#     bc (Backup Control)                     ="
print -u4 "#        xb -> AIX Backup (Level 0 AIX FS Backup) ="
print -u4 "#        no -> NO Backup (Skip filesystem)    ="
print -u4 "#        as -> ADSM Selective Backup          ="
print -u4 "#        ai -> ADSM Incremental Backup        ="
print -u4 "#        aa -> ADSM Archive                   ="
print -u4 "#                                             ="
print -u4 "#                                             ="
print -u4 "#     pfs (Primary Filesystem)                ="
print -u4 "#        The full path of standard filesystem ="
print -u4 "#                                             ="
print -u4 "#     plv (Primary Logical Volume)            ="
```

*FIG. 8E*

```
                     print -u4 "#         The AIX LV name of the logical volume    ="
print -u4 "#                  containing the primary filesystem         ="
print -u4 "#                                                             ="
print -u4 "#       c (Copies)                                            ="
print -u4 "#         The number of AIX LVM copies of the                 ="
print -u4 "#         logical volume containing primary                   ="
print -u4 "#         filesystem.                                         ="
print -u4 "#         Must be numeric 1,2, or 3.                          ="
print -u4 "#                                                             ="
print -u4 "#       afs (Alternate Filesystem)                            ="
print -u4 "#         The full path of mirror copy filesystem             ="
print -u4 "#         Must be unique!!!!                                  ="
print -u4 "#                                                             ="
print -u4 "#       alv (Alternate Logical Volume)                        ="
print -u4 "#         The AIX LV name of the logical volume               ="
print -u4 "#         containing the alternate filesystem                 ="
print -u4 "#         Must be unique!!!!                                  ="
print -u4 "#                                                             ="
print -u4 "#     Example for a mirrored home filesystem to be            ="
print -u4 "#        backed up using AIX backup command:                  ="
print -u4 "#                                                             ="
print -u4 "#     xb:/home:hd1:2:/alt/home:altlvh                         ="
print -u4 "#                                                             ="
print -u4 "#======================================================="

print -u3 "\nStarting Build of Filesystem Backup Table File."
print -u3 "\nTable lines are:"
ncrement=0
return_code=0
for fs_line in $(lsfs -ac | grep -v ~#)
do
   if [[ $(print $fs_line | cut -f 3 -d : ) = jfs ]]; then
     fs_prime=$(print $fs_line | cut -f 1 -d :)
     lv_prime=$(print $fs_line | cut -f 2 -d : | cut -c 6-)

# What if LV in /etc/filesystems does not actually exist?
LSLV below croaks copies=$(lslv $lv_prime | grep COPIES | awk '{ print $2 }')
     if [[ $copies -eq 1 ]]; then
         tab_line=xb:$fs_prime:$lv_prime:$copies
     elif [[ $copies -eq 2 ]]; then
         tab_line=xb:$fs_prime:$lv_prime:$copies:/alt/fs$ncrement:altlv$ncrement
         ((ncrement=$ncrement+1))
     elif [[ $copies -eq 3 ]]; then
         tab_line=xb:$fs_prime:$lv_prime:$copies:/alt/fs$ncrement:altlv$ncrement
         ((ncrement=$ncrement+1))
     else
```

*FIG. 8F*

```
        tab_line=xb:$fs_prime:$lv_prime:1
        print -u2 "Script execution error: AIX lslv output confusion."
        print -u3 "Script execution error: AIX lslv output confusion."
        ((return_code=$return_code+1))
    fi
    print -u3 $tab_line
    print -u4 $tab_line
    fi
done exec 3<&-
exec 4<&-

# Test for filesystem parsing problems
if [[ $return_code -ne 0 ]]; then
    exit 10
fi exit 0
-
```

*FIG. 8G*

```
            else
                print -u3 "Filesystem" $target_fs "not mountable. Not backed up!"
                return_code=1
            fi
        fi
    done exec 3<&-

Test for unsuccessful filesystem merges
    if [[ $merge_return_code -ne 0 ]]; then
        exit 20
    fi rm $lock_file 2>/dev/null
    chmod 644 $config_file

# Test for unsuccessful filesystem backups
    if [[ $return_code -ne 0 ]]; then
        exit 10
    fi exit 0
-
```

*FIG. 12J*

```
#!/bin/ksh
######################################################################

#  fscpbktab_check.ksh
#              Version 0.33
#                       Runs various AIX commands to check filesystem
#                         table file
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

######################################################################

#--------------------------------

Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

```
This program is distributed on an "as is" basis,
no warranty is expressed or implied.

#---------------------------------------

#---------------------------------------

# Description: Performs syntax check on FSCPBK table file.
#          Part of FSCPBK package of scripts.
# Operational Environment: AIX V4 and ADSM V3.1
# Input:
# Output:
# Return Value:
# Comments:

#---------------------------------------

#---------------------------------------

# Version History: None

#---------------------------------------

#---------------------------------------

# Environmental Variables

#---------------------------------------
# Constants
bar='===================================================' wire='-----------------------------------------'

Variables
numeric_date=$(date +%m%d%y)
text_date=$(date +%d%b%Y)
typeset -i return_code
typeset -i retain_days=90
typeset -i in_retain_days
typeset -i copies
typeset -i lv_copies
typeset -i lv_disks
typeset -i ncrement
typeset -i return_code
invoked_name=$0
script_name=${invoked_name##*/}
user_id=$(whoami)
```

FIG. 9C

```
# Process Control Variables
l_flag=0
L_flag=0
r_flag=0

Files default_log_dir=/var/adm/scriptlogs
default_log_file=$script_name.$text_date
work_file1=/tmp/$script_name.$text_date.work1
work_file2=/tmp/$script_name.$text_date.work2
config_file=/etc/fscpbktab
audit_file=/etc/fscpbktab.audit
lock_file=/var/locks/fscpbktab

#------------------------------------

# Function: show_usage
Description: Displays command usage syntax and exits
Input: None
Output: Usage message to standard error
Return Value: 2
Note: This function does not return. It completely exits.

#------------------------------------
show_usage ()
{
    print -u2 "         "
    print -u2 "Usage: fscpbktab_check.ksh [-l directory] [-r days]"
    print -u2 "         "
    print -u2 "    -l directory  Log output directory."
    print -u2 "          Default is" $default_log_dir
    print -u2 "         "
    print -u2 "    -r days    Log retention period."
    print -u2 "          Default is" $retain_days
    print -u2 "         "
    exit 2
}

#------------------------------------

# Korn Shell Settings

#------------------------------------
#set -o errexit     # Turn on error trapping and error exit mode
#set -o noclobber   # Prevent overwriting of existing files
#set -o noexec      # Perform syntax checking without execution
#set -o nolog       # Prevents storing function defs in history file
#set -o xtrace      # Turn on debug mode
```

*FIG. 9D*

```
#----------------------------------------

# Main Routine

#----------------------------------------

# Test for any passed parameters.
#if [ $? != 0 ]
#then
show_usage
fi

log_dir=$default_log_dir
# Parse Command Line Arguments into Variables
while getopts a:l:p:r# c
do
   case $c in
   l)  # Set up the -l flag
       l_flag=1
       log_dir=$OPTARG;;
   r)  # Set up the -r flag
       r_flag=1
       in_retain_days=$OPTARG;;
   :)  show_usage;;
   \?) show_usage;;
   esac
done
shift $((OPTIND-1))

Deal with invocation errors

# Configure Logging
if [[ $l_flag -eq 1 ]]; then
    log_file=$in_log_dir/$default_log_file
    mkdir -p $in_log_dir 2>/dev/null   #Create new log directory
else
    log_file=$default_log_dir/$default_logfile
    mkdir -p $default_log_dir 2>/dev/null # Create default log directory
fi if [[ $r_flag -eq 1 ]]; then
    retain_days=$in_retain_days
fi

# Clear old logs
find $log_dir -name "$script_name*" -mtime $retain_days -exec rm {}\;

# Create new log file
exec 3>> $log_file # Open log file for writing
```

```
print -u3 "\n=================================================="
print -u3 "=                                                 ="
print -u3 "=  Systems Management Transaction Log             ="
print -u3 "=                                                 ="
print -u3 "=  Created by script:" $script_name
print -u3 "=        on system:" $(hostname)
print -u3 "=        at    :" $(date)
print -u3 "=                                                 ="
print -u3 "=================================================="

Perform Work

# Test for existing table file
if [[ ! (-r $config_file) ]]; then
        print -u2 "Table error: Table file" $config_file "does not exist."
        print -u3 "Table error: Table file" $config_file "does not exist."
    exit 99
fi

# Test for locked table file
if [[ -f $lock_file ]]; then
    print -u2 "Warning: Table file is currently in use and locked."
    print -u3 "Warning: Table file is currently in use and locked."
fi

# Perform Syntax Checking on Table File
return_code=0
ncrement=1
for fs_line in $(cat $config_file | grep -v ^#)
do
    action=$(print $fs_line | cut -f 1 -d :)
    case $action in
       xb) : ;;
       no) : ;;
       as) : ;;
       ai) : ;;
       aa) : ;;
       *) print -u2 "Table error: Action" $action "not valid."
          print -u3 "Table error: Action" $action "not valid."
          ((return_code=$return_code+1));;
    esac
    fs_prime=$(print $fs_line | cut -f 2 -d :)
    lv_prime=$(print $fs_line | cut -f 3 -d :)
    if [[ $(lsfs -c $fs_prime | grep $lv_prime | wc -l) -ne 1 ]]; then
        print -u2 "Table error: Filesystem" $fs_prime "does not reside in LV $lv_prime
        print -u3 "Table error: Filesystem" $fs_prime "does not reside in LV $lv_prime
           ((return_code=$return_code+1))
    fi
    copies=$(print $fs_line | cut -f 4 -d :)
```

```
if [[ ($copies -ge 1) && ($copies -le 3) ]]; then
    if [[ ($copies -gt 1) && ($copies -le 3) ]]; then
        fs_alt=$(print $fs_line | cut -f 5 -d :)
        lv_alt=$(print $fs_line | cut -f 6 -d :)
        if [[ $(lsfs -c $fs_alt 2>/dev/null | wc -l) -ne 0 ]]; then
            print -u2 "Table error: Filesystem" $fs_alt "already exists."
            print -u3 "Table error: Filesystem" $fs_alt "already exists."
            ((return_code=$return_code+1))
        fi
        if [[ $(lslv $lv_alt 2>/dev/null | wc -l) -ne 0 ]]; then
            print -u2 "Table error: LV" $lv_alt "already exists."
            print -u3 "Table error: LV" $lv_alt "already exists."
            ((return_code=$return_code+1))
        fi
        strictness_flag=$(lslv $lv_prime | grep "EACH LP COPY ON" | grep yes | wc -l)
        if [[ $strictness_flag -eq 0 ]]; then
            print -u2 "LVM Warning: Mirror strictness not set for LV" $lv_prime
            print -u3 "LVM Warning: Mirror strictness not set for LV" $lv_prime
        fi
        lv_copies=$(lslv $lv_prime | grep COPIES | awk'{ print $2 }')
        if [[ $lv_copies -ne $copies ]]; then
            print -u2 "LVM Warning: LV mirroring does not match table for LV" $lv_prime
            print -u3 "LVM Warning: LV mirroring does not match table for LV" $lv_prime
        fi
        lv_disks=$(lslv -l $lv_prime | grep hdisk | wc -l)
        if [[ $lv_disks -ne $lv_copies ]]; then
            print -u2 "LVM Warning: Broad LV mirroring distribution for LV" $lv_prime
            print -u3 "LVM Warning: Broad LV mirroring distribution for LV" $lv_prime
        fi
    fi
else
    print -u2 "Table error: Invalid number of LV copies for LV" $lv_prime
    print -u3 "Table error: Invalid number of LV copies for LV" $lv_prime
    ((return_code=$return_code+1))
fi
done if [[ ($return_code -ne 0) ]];then
 return 98
else
 print -u2 "Table file parses okay."
 exec 4> $audit_file # Open audit file for writing
 current_Y=$(date +%Y)
 current_m =$(date +%m)
 current_d=$(date +%d)
 current_H =$(date +%H)
 current_M=$(date +%M)
 #   print -u4 $current_Y $current_m $current_d $current_H $current_M
    print -u4 $current_Y$current_m$current_d$current_H$current_M
    exec 4<&-
```

```
#!/bin/ksh
##################################################################

# fscpb_sync.ksh
#               Version 0.02
#                       Runs various AIX commands to synchronize all
#                         stale logical volumes
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

##################################################################
#-------------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

*FIG. 10A*

```
This program is distributed on an "as is" basis,
no warranty is expressed or implied.

#------------------------------------

#------------------------------------

# Description: Synchronizes all logical volumes with stale partitions
#           Part of FSCPBK package.
# Operational Environment: AIX V4
# Input:
# Output:
# Return Value:
# Comments:

#------------------------------------

#------------------------------------

# Version History: None

#------------------------------------

#------------------------------------

# Environmental Variables

#------------------------------------
# Constants
bar='================================================='
,
wire='=---------------------------------'

# Variables
numeric_date=$(date +%m%d%y)
text_date=$(date +%d%b%Y)
typeset -i return_code
typeset -i retain_days=90
typeset -i in_retain_days
typeset -i copies
typeset -i ncrement
typeset -i return_code
invoked_name=$0
script_name=${invoked_name##*/}
user_id=$(whoami)
```

FIG. 10B

```
# Process Control Variables
l_flag=0
L_flag=0
r_flag=0

Files default_log_dir=/var/adm/scriptlogs
default_log_file=$script_name.$text_date
work_file1=/tmp/$script_name.$text_date.work1
work_file2=/tmp/$script_name.$text_date.work2
config_file=/etc/fscpbktab

#------------------------------------------------

# Function: show_usage
Description: Displays command usage syntax and exits
Input: None
Output: Usage message to standard error
Return Value: 2
#     Note: This function does not return.  It completely exits.

#------------------------------------------------
show_usage ()
{
   print -u2 "              "
   print -u2 "Usage: fscpbk_sync.ksh [-l directory] [-r days] "
   print -u2 "              "
   print -u2 "      -l directory   Log output directory."
   print -u2 "                     Default is $default_log_dir
   print -u2 "              "
   print -u2 "      -r days        Log retention period."
   print -u2 "                     Default is" $retain_days
   print -u2 "              "
   exit 2
}

#------------------------------------------------

# Korn Shell Shell Settings

#------------------------------------------------
#set -o errexit    #Turn on error trapping and error exit mode
#set -o noclobber  # Prevent overwriting of existing files
#set -o noexec     # Perform syntax checking without execution
#set -o nolog      # Prevents storing function defs in history file
#set -o xtrace     # Turn on debug mode

```
# Main Routine

#-------------------------------------------

# Test for any passed parameters.
#if [ $? != 0 ]
#then
show_usage
fi
log_dir=$default_log_dir
# Parse Command Line Arguments into Variables
while getopts l:r# c
do
   case $c in
   l) # Set up the -l flag
      l_flag=1
      log_dir=$OPTARG;;
   r) # Set up the -r flag
      r_flag=1
      in_retain_days=$OPTARG;;
   :) show_usage;;
   \?) show_usage;;
   esac
done
shift $((OPTIND-1))

Deal with invocation errors
if [[ $user_id != root ]]; then
  show_usage
fi

# Configure Logging
if [[ $l_flag -eq 1 ]]; then
     log_file=$in_log_dir/$default_log_file
     mkdir -p $in_log_dir 2>/dev/null   #Create new log directory
else
     log_file=$default_log_dir/$default_log_file
     mkdir -p $default_log_dir 2>/dev/null # Create default log directory
fi if [[ $r_flag -eq 1 ]]; then
  retain_days=$in_retain_days
fi

# Clear old logs
find $log_dir -name "$script_name*" -mtime $retain_days -exec rm {}\;
```

```
# Create new log file
exec 3>> $log_file  # Open log file for writing print -u3 "\n=================================================="
print -u3 "=                                                ="
print -u3 "= Systems Management Transaction Log             ="
print -u3 "=                                                ="
print -u3 "=   Created by script:" $script_name
print -u3 "=        on system:" $(hostname)
print -u3 "=        at     :" $(date)
print -u3 "=                                                ="
print -u3 "=================================================="

Perform Work

Test for any stale logical volumes within active volume groups print -u1 "Starting syncvg operation. This make take several minutes."
return_code=0
for logical_volume in $(lsvg -o | lsvg -il | grep stale | awk'{ print $1 }')
do
    print -u3 " Starting syncvg operation on LV" $logical_volume
    print -u1 "Starting syncvg operation on LV" $logical_volume
    syncvg -l $logical_volume
    ((return_code=$return_code+$?))
    print -u3 " Completed syncvg operation on LV" $logical_volume
    print -u3 " Cumulated return code is" $return_code
done exec 3<&-
if [[ ($return_code -ne 0) ]];then
    return 50
fi exit 0
```

*FIG. 10E*

```
#!/bin/ksh
###################################################################

# fscpb_select.ksh
#              Version 0.34
#                       Runs various AIX commands to select and split
#                          filesystems for backup
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

###################################################################
#-------------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

FIG. 11A

```
This program is distributed on an "as is" basis,
no warranty is expressed or implied.

#---------------------------------------

#---------------------------------------

# Description: Selects and splits filesystems for backup.
#       Part of FSCPBK package of scripts.
# Operational Environment: AIX V4
# Input:
# Output:
# Return Value:
# Comments:

#---------------------------------------

#---------------------------------------

# Version History: None

#---------------------------------------

#---------------------------------------

# Environmental Variables

#---------------------------------------
# Constants
bar='========================================================
',
wire='=-------------------------------------------------'

# Variables
numeric_date=$(date +%m%d%y)
text_date=$(date +%d%b%Y)
typeset -i return_code
typeset -i retain_days=90
typeset -i in_retain_days
typeset -i copies
typeset -i new_copies
typeset -i ncrement
typeset -i ntest
typeset -i return_code
#typeset -i edit_year
#typeset -i edit_month
#typeset -i edit_day
#typeset -i edit_hour
```

FIG. 11B

```
#typeset -i edit_minute
typeset -i edit_stamp
typeset -i audit_year
typeset -i audit_month
typeset -i audit_day
typeset -i audit_hour
typeset -i audit_minute
typeset -i audit_stamp
invoked_name=$0
script_name=${invoked_name##*/}
user_id=$(whoami)
```

FIG. 11C

```
# Process Control Variables
L_flag=0
L_flag=0
r_flag=0
o_flag=0

Files default_log_dir=/var/adm/scriptlogs
default_log_file=$script_name.$text_date
work_file1=/tmp/$script_name.$text_date.work1
work_file2=/tmp/$script_name.$text_date.work2
config_file=/etc/fscpbktab
audit_file=/etc/fscpbktab.audit
lock_file=/var/locks/fscpbktab

#-----------------------------------

# Function: show_usage
Description: Displays command usage syntax and exits
Input: None
Output: Usage message to standard error
Return Value: 2
Note: This function does not return. It completely exits.

#-----------------------------------
show_usage ()
{
   print -u2 "         "
   print -u2 "Usage: fscpbk_select.ksh -o [-l directory] [-r days] "
   print -u2 "         "
   print -u2 "       -o      Override active volume protection."
   print -u2 "               WARNING!!: Data integrity risk."
   print -u2 "               IBM not responsible for"
   print -u2 "               loss of data or integrity"
   print -u2 "               if override used to split"
```

```
            print -u2 "                a mirrored filesystem"
            print -u2 "                that is mounted!"
            print -u2 "      "
            print -u2 "    -l directory  Log output directory."
            print -u2 "                  Default is" $default_log_dir
            print -u2 "      "
            print -u2 "    -r days       Log retention period."
            print -u2 "                  Default is" $retain_days
            print -u2 "      "
            exit 2
}

#------------------------------------

# Korn Shell Settings

#------------------------------------
#set -o errexit    # Turn on error trapping and error exit mode
#set -o noclobber  # Prevent overwriting of existing files
#set -o noexec     # Perform syntax checking without execution
#set -o nolog      # Prevents storing function defs in history file
#set -o xtrace     # Turn on debug mode

#------------------------------------

# Main Routine

#------------------------------------

# Test for any passed paramaters.
#if [ $? != 0 ]
#then
show_usage
fi

log_dir=$default_log_dir
# Parse Command Line Arguments into Variables
while getopts o:l:r# c
do
   case $c in
   o)   # Set up the -o flag
        o_flag=1;;
   l)   # Set up the -l flag
        l_flag=1
        log_dir=$OPTARG;;
   r)   # Set up the -r flag
        r_flag=1
        in_retain_days=$OPTARG;;
   :)   show_usage;;
   \?)  show_usage;;
```

*FIG. 11D*

```
        esac
done
shift $((OPTIND-1))

Deal with invocation errors
if [[ $user_id != root ]]; then
    show_usage
fi if [[ $o_flag -ne 1 ]]; then
    show_usage
fi

# Configure Logging
if [[ $L_flag -eq 1 ]]; then
    log_file=$in_log_dir/$default_log_file
    mkdir -p $in_log_dir 2>/dev/null    #Create new log directory
else
    log_file=$default_log_dir/$default_log_file
    mkdir -p $default_log_dir 2>/dev/null   # Create default log directory
fi if [[ $r_flag -eq 1 ]]; then
    retain_days=$in_retain_days
fi

# Clear old logs
find $log_dir -name "$script_name*" -mtime $retain_days -exec rm{}\;

# Create new log file
exec 3>> $log_file  # Open log file for writing print -u3 "\n=========================================================="
print -u3 "=                                                        ="
print -u3 "=  Systems Management Transaction Log                    ="
print -u3 "=                                                        ="
print -u3 "=   Created by script:" $script_name
print -u3 "=       on system:" $(hostname)
print -u3 "=       at       :"$(date)
print -u3 "=                                                        ="
print -u3 "=========================================================="

Perform Work

# Test for existing table file
if [[ ! (-r $config_file) ]]; then
    print -u2 "Fatal Table error. Table file" $config_file "not found."
```

FIG. 11E

```
        print -u3 "Fatal Table error. Table file" $config_file "not found."
        exec 3<&-
        exit 99
fi

Test for existing table audit file
if [[ ! (-r $audit_file) ]]; then
        print -u2 "Fatal Table error. Table file check program must be run."
        print -u3 "Fatal Table error. Table audit file" $audit_file "not found."
        exec 3<&-
        exit 97
fi

Test for table file audit indicating syntax check since last edit current_Y=$(date +%Y)

audit_stamp=$( head -1 $audit_file | awk '{ print $1 }')

# Check for colon and thus time instead of year on file datestamp
ntest=$(ls -l $config_file | awk'{ print $8 }' | grep : | wc -l)
if [[ $ntest -eq 1 ]]; then
      edit_year=$current_Y
else edit_year=$(ls -l $config_file | awk'{ print $8 }')
fi edit_month_text=$(ls -l $config_file | awk '{ print $6 }')
edit_day=$(ls -l $config_file | awk '{ print $7 }')
edit_hour=$(ls -l $config_file | awk '{ print $8 }' | cut -f 1 -d :)
edit_minute=$(ls -l $config_file | awk '{ print $8 }' | cut -f 2 -d :)

# Determine month number from month name
case $edit_month_text in
Jan)   edit_month=01;;
Feb)   edit_month=02;;
Mar)   edit_month=03;;
Apr)   edit_month=04;;
May)   edit_month=05;;
Jun)   edit_month=06;;
Jul)    edit_month=07;;
Aug)   edit_month=08;;
Sep)   edit_month=09;;
Oct)   edit_month=10;;
Nov)   edit_month=11;;
Dec)   edit_month=12;;
```

*FIG. 11F*

```
    *)    print -u2 "Fatal Table error. Table file date read error."
          print -u3 "Fatal Table error. Table file date read error."
          exec 3<&-
          exit 98;;
esac
```

*FIG. 11G*

```
edit_stamp=$edit_year$edit_month$edit_day$edit_hour$edit_minute

Test for table file audited since last editing
if [[ $audit_stamp -le $edit_stamp ]]; then
    print -u2 "Fatal Table error. Table file edited since last checked."
    print -u3 "Fatal Table error. Table file edited since last checked."
    exec 3<&-
    exit 97
fi

# Test for locked table file and exit
if [[ -f $lock_file ]]; then
    print -u2 "Table file is currently in use and locked."
    print -u3 "Table file is currently in use and locked."
    exec 3<&-
    exit 96
fi

# Table file format
# Format: bc:pfs:plv:c:afs:alv                =
# xb:/home:hd1:2:/alt/home:/altlvh            =

# Create lock on table file to indicate that table is in use.
touch $lock_file
chmod 000 $config_file

# Increment through table file and split mirrored filesystems
return_code=0
ncrement=0
for fs_line in $(cat $config_file | grep -v ~#)
do
    action=$(print $fs_line | cut -f 1 -d :)
    copies=$(print $fs_line | cut -f 4 -d :)
    if [[ ($copies -gt 1) && ($action != no) ]]; then
        fs_prime=$(print $fs_line | cut -f 2 -d :)
        lv_prime=$(print $fs_line | cut -f 3 -d :)
        fs_alt=$(print $fs_line | cut -f 5 -d :)
        lv_alt=$(print $fs_line cut -f 6 -d :)
        tag_file=$fs_prime/.fscpbk_$lv_prime
        exec 4> $tag_file      # Open tag file for overwriting
```

```
        print -u4 "#================================================"
        print -u4 "#=                                              ="
        print -u4 "#= Tag file used by IBM FSCPBK Utility.         ="
        print -u4 "#= DO NOT DELETE THIS FILE!!!!!!!!!!!!!         ="
        print -u4 "#=                                              ="
        print -u4 "#= Files in this directory and subdirectories below ="
        print -u4 "#=   were originally contained within filesystem:   ="
        print -u4 "#=   " $fs_prime
        print -u4 "#=                                              ="
        print -u4 "#================================================"
        exec 4<&-
        ((new_copies=$copies-1))
        sync;sync
        split_fs_copy.ksh -f $fs_prime -n $fs_alt -y $lv_alt -c $new_copies -o
        ((return_code=$return_code+$?))
        print -u3 $action $fs_prime $lv_prime $copies $fs_alt $lv_alt
     fi
done exec 3<&- if [[ ($return_code -ne 0) ]];then
    exit 10
else
  exit 0
fi

```
#!/bin/ksh
########################################################################

# fscpb_back.ksh
#           Version 0.34
#                       Runs various AIX commands to backup and merge
#                         filesystems
#                       Assembled by Carl Gusler
IBM Global Services
IBM Austin
cgusler@us.ibm.com

#                       (With help from many friends)

#                       Copyright IBM 1996,1997, 1998, 1999
#                       Controlled Distribution
Protected under the procedures, processes, rights
rules, regulations, and retributions of
IBM Global Services
Intellectual Capital Management

########################################################################

#-----------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

*FIG. 12A*

```
This program is distributed on an "as is" basis,
no warranty is expressed or implied.

#----------------------------------------

#----------------------------------------

# Description: Provides capability to perform split mirror backups.
#              Part of FSCPBK package.
# Operational Environment: AIX V4 and ADSM V3.1
# Input:
# Output:
# Return Value:
# Comments:

#----------------------------------------

#----------------------------------------

# Version History: None

#----------------------------------------

#----------------------------------------

# Environmental Variables

#----------------------------------------
# Constants
bar='================================================================
'
wire='=--------------------------------------'

Variables
numeric_date=$(date +%m%d%y)
text_date=$(date +%d%b%Y)
typeset -i return_code
typeset -i merge_return_code
typeset -i retain_days=90
typeset -i in_retain_days
typeset -i copies
typeset -i ncrement
typeset -i mount_fs_test
invoked_name=$0
script_name=${invoked_name##*/}
user_id=$(whoami)
desc='ADSM Archive at '$text_date
level=0
use_tape=0
```

FIG. 12B

```
# Process Control Variables
l_flag=0
L_flag=0
r_flag=0
d_flag=0

Files default_log_dir=/var/adm/scriptlogs
default_log_file=$script_name.$text_date
default_backup_device=/dev/rmt0.1
work_file1=/tmp/$script_name.$text_date.work1
work_file2=/tmp/$script_name.$text_date.work2
config_file=/etc/fscpbktab
audit_file=/etc/fscpbktab.audit
lock_file=/var/locks/fscpbktab

#--------------------------------

# Function: show_usage
Description: Displays command usage syntax and exits
Input: None
Output: Usage message to standard error
Return Value: 2
Note: This function does not return. It completely exits.

#--------------------------------
show_usage ()
{
  print -u2 "    "
  print -u2 "Usage: fscpbk_ack.ksh [-d device] [-l directory] [-r days]"
  print -u2 "    "
  print -u2 "    -d device    Backup output device."
  print -u2 "              Default is" $default_backup_device
  print -u2 "    "
  print -u2 "    -l directory   Log output directory."
  print -u2 "              Default is" $default_log_dir
  print -u2 "    "
  print -u2 "    -r days     Log retention period."
  print -u2 "              Default is" $retain_days
  print -u2 "    "
  exit 2
}
```

```
#------------------------------------

# Korn Shell Settings

#------------------------------------
#set -o errexit    # Turn on error trapping and error exit mode
#set -o noclobber  # Prevent overwriting of existing files
#set -o noexec     # Perform syntax checking without execution
#set -o nolog      # Prevents storing function defs in history file
#set -o xtrace     # Turn on debug mode

#------------------------------------

# Main Routine

#------------------------------------

# Test for any passed parameters.
#if [ $? != 0 ]
#then
show_usage
fi

log_dir=$default_log_dir
# Parse Command Line Arguments into Variables
while getopts d:l:r# c
do
   case $c in
     d)   # Set up the -d flag
          d_flag=1
          in_backup_device=$OPTARG;;
     l)   # Set up the -l flag
          l_flag=1
          log_dir=$OPTARG;;
     r)   # Set up the -r flag
          r_flag=1
          in_retain_days=$OPTARG;;
     :)   show_usage;;
     \?)  show_usage;;
   esac
done
shift $((OPTIND-1))

Deal with invocation errors
if [[ $user_id ! = root ]] then
       show_usage
fi

# Locate target file or device for backup images
if [[ $d_flag -eq 1 ]]; then
```

FIG. 12E

```
    if [[ $in_backup_device = /dev/rmt[0-9]* ]]; then    # Test if target is tape drive
        use tape=1
        if [[ -c tin backup device ]]; then  # Test if tape drive exists
            device=$in_backup_device
        else
            print -u2 "\nNonexistent tape drive" $in_backup_device
            show-Usage
        fi
    else    # Should we check to make sure some disk device not chosen?
            device=$ in_backup_device
    fi
else
    device=$default_backup_device
fi

# Configure Logging
if [[ $l - flag -eq 1 ]]; then
        log_file=$in_log_dir/$default_log_file
        mkdir -p $in_log_dir 2>/dev/null    #Create new log directory
else
        log_file=$default_log_dir/$default_log_file
        mkdir -p $default_log_dir 2>/dev/null    # Create default log directory
fi if [[ $r_flag -eq 1 ]]; then
        retain_days=$in_retain_days
fi

# Clear old logs
    find $log_dir -name "$script_name*" -mtime $retain_days -exec rm {}\;

# Create new log file
exec 3>> $log_file  # Open log file for writing print -u3 "\n================================================="
print -u3 "=                                                ="
print -u3 "= Systems Management Transaction Log             ="
print -u3 "=                                                ="
print -u3 "= Created by script:" $script_name
print -u3 "=      on system:" $(hostname)
print -u3 "=      at       :" $(date)
print -u3 "=                                                ="
print -u3 "================================================="
```

```
# Perform Work

# Test for existing table file
if [[ ! (-r $config_file) ]]; then
    print -u2 "Fatal Table error. Table file" $config_file "not found."
    print -u3 "Fatal Table error. Table file" $config_file "not found."
    exec 3<&-
    exit 99
fi

Test for existing table audit file
if [[! (-r $audit_file) ]]; then
    print -u2 "Fatal Table error. Table file check program must be run."
    print -u3 "Fatal Table error. Table audit file" $audit_file "not found."
    exec 3<&-
    exit 97
fi

Test for table file audit indicating syntax check since last edit current_Y=$(date +%Y)

audit_stamp=$( head -1 $audit_file | awk '{ print $1 }')

# Check for colon and thus time instead of year on file datestamp
ntest=$(ls -l $config_file | awk '{ print $8 }' | grep : | wc -l)
if [[  $ntest -eq 1 ]]; then
    edit_year=$current_Y
else edit_year=$(ls -l $config_file | awk '{ print $8 }')
fi edit_month_text=$(ls -l $config_file | awk '{ print $6 }')
edit_day=$(ls -l $config_file | awk '{ print $7 }')
edit_hour=$(ls -l $config_file | awk '{ print $8 }' | cut -f 1 -d :)
edit_minute=$(ls -l $config_file | awk '{ print $8 }' | cut -f 2 -d :)

# Determine month number from month name
case $edit_month_text in
Jan) edit_month=01;;
Feb) edit_month=02;;
Mar) edit_month=03;;
Apr) edit_month=04;;
May) edit_month=05;;
Jun) edit_month=06;;
Jul) edit_month=07;;
```

```
Aug)   edit_month=08;;
Sep)   edit_month=09;;
Oct)   edit_month=10;;
Nov)   edit_month=11;;
Dec)   edit_month=12;;
*)  print -u2 "Fatal Table error. Table file date read error."
    print -u3 "Fatal Table error. Table file date read error."
    exec 3<&-
    exit 98;;
esac edit_stamp=$edit_year$edit_month$edit_day$edit_hour$edit_minute

Test for table file audited since last editing
if [[ $audit_stamp -le $edit_stamp ]]; then
    print -u2 "Fatal Table error. Table file edited since last checked."
    print -u3 "Fatal Table error. Table file edited since last checked."
    exec 3<&-
    exit 97
fi

# Table file format
# Format: bc:pfs:plv:c:afs:alv              =
xb:/home:hd1:2:/alt/home:/altlvh          = ncrement=0
return_code=0
# Cycle through filesystems and mount unmounted ones
for fs_line in $(cat $config_file | grep -v ~#)
do
    action=$(print $fs_line | cut -f 1 -d :)
    fs_prime=$(print $fs_line cut -f 2 -d :)
    lv_prime=$(print $fs_line cut -f 3 -d :)
    copies=$(print $fs_line | cut -f 4 -d :)
    target_fs=$fs_prime
    if [[ $action != no ]]; then
        if [[ $copies -gt 1 ]]; then
            target_fs= $(print $fs_line I cut -f 5 -d :)
        fi
```

FIG. 12H

```
# Check to see if target filesystem is mounted
        mount_fs_test=$(mount | grep "$target_fs | wc -l)
# If not mounted, mount as readonly for backups
        if [[ $mount_fs_test -ne 1 ]]; then
                mount -o ro $target_fs >>$log_file 2>>$log_file
                return_code=$?
# Test for unsuccessful readonly filesystem mount
            if [[ $return_code -ne 0 ]]; then
# If still unsuccessful, then perform filesystem check (presume dirty superblock)
                    print -u3 "Performing fsck on filesystem" $target_fs
                    fsck -p $target_fs >>$log_file 2>>$logfile
                    mount -o ro $target_fs 2>>$log_file
            fi
        fi
    fi done
return_code=0
merge_return_code=0

#   Put Table File at start of tape to serve as tape TOC
if [[ $use_tape -eq 1 ]]; then
      cp /etc/fscpbktab .
      echo "./fscpbktab"| backup -ipqf $device
      rm ./fscpbktab
fi

# Cycle through filesystems and perform backups and merges
for fs_line in $(cat $config_file | grep -v ~#)
do
        action=$(print $fs_line | cut -f 1 -d :)
        fs_prime=$(print $fs_line | cut -f 2 -d :)
        lv_prime=$(print $fs_line | cut -f 3 -d :)
        copies=$(print $fs_line | cut -f 4 -d :)
        target_fs=$fs_prime
        print -u3 $action $fs_prime $lv_prime $copies
        if [[ $action != no ]]; then
#       Select to backup alternate mirror fs if mirroring on
            if [[ $copies -gt 1 ]]; then
                    fs_alt=$(print $fs_line cut -f 5 -d :)
                    lv_alt=$(print $fs_line cut -f 6 -d :)
                    target_fs=$fs_alt
                    print -u3 $action $fs_prime $lv_prime $copies $fs_alt $lv_alt
            fi
```

```
        mount_fs_test=$(mount | grep "$target_fs" | wc -l)
#       Test for filesystem STILL not mounted
        if [[ $mount_fs_test -eq 1 ]]; then
    case $action in
    no) # Perform no backup action
        print -u3 "No backup performed on filesystem" $target_fs;;
    xb) # Perform AIX Level 0 filesystem backup
        print -u3 "Starting AIX Level 0 backup on filesystem" $target_fs "at" $(date)
        backup -$level -u -f $device $target_fs
        return_code=$return_code+$?
        print -u3 "Completed AIX Level 0 backup on filesystem" $target_fs "at" $(date);;
    as) # Perform ADSM Selective filesystem backup
        print -u3 "Starting ADSM Selective backup on filesystem" $target_fs "at" $(date)
        dsmc sel "$target_fs/*" >$work_file1
        return_code=$return_code+$?
        cat $work_file1 >>$log_file
        print -u3 "\n ------------------------------"
        print -u3 "Completed ADSM Selective backup on filesystem" $target_fs "at" $(date);;
    ai) # Perform ADSM Incremental filesystem backup
        print -u3 "Starting ADSM Incremental backup on filesystem" $target_fs "at" $(date)
        dsmc i $target_fs >$work_file1
        return_code=$return code+$?
        cat $work_file1 >>$log_file
        print -u3 "\n------------------------------"
        print -u3 "Completed ADSM Incremental backup on filesystem" $target_fs_prime "at"
$(date);;
    aa) # Perform ADSM Archive filesystem archive
        print -u3 "Starting ADSM Archive on filesystem" $target_fs "at" $(date)
        dsmc archive $target_fs/ -des="$desc" >$work_file1
        return_code=$return_code+$?
        cat $work_file1 >>$log_file
        print -u3 "\n ------------------------------"

print -u3 "Completed ADSM Archive on filesystem" $target_fs "at" $(date);;
    esac
#   Merge split filesystems if mirrored
#       NOTE!!: This section is duplicated in the fscpbk_merge.ksh
#           script. Any changes anywhere in this script should
#           probably be duplicated in that script!

        if [[ $copies -gt 1 ]]; then
            merge_fs_copy.ksh -p $fs_prime -s $fs_alt
merge_return_code=$merge_return_code+$?
#           fs_alt=$(print $fs_line | cut -f 5 -d :)
lv_alt=$(print $fs_line | cut -f 6 -d :)
#           target_fs=$fs_alt
        fi
```

FIG. 12I

```
#!/bin/ksh
########################################################################

# fscpb_merge.ksh
#              Version 0.01
#                       Runs various AIX commands to merge
#                          filesystems
#                       Assembled by Carl Gusler
IBM Global Services
IBM Austin
cgusler@us.ibm.com

#                       (With help from many friends)

#                       Copyright IBM 1996, 1997, 1998, 1999
#                       Controlled Distribution
Protected under the procedures, processes, rights
rules, regulations, and retributions of
IBM Global Services
Intellectual Capital Management

########################################################################

#---------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.
```

*FIG. 13A*

```

This program is distributed on an "as is" basis,
no warranty is expressed or implied.

#----------------------------------------

#----------------------------------------

# Description: Remerges filesystems split from mirrored LVs.
#              A cleanup utility for problem times with FSCPBK scripts
# Operational Environment: AIX V4
# Input:
# Output:
# Return Value:
# Comments: NOTE!!: This script is an excerpt of the fscpbk_back.ksh
script. If that script is edited, this one
should probably be edited to match.

#----------------------------------------

#----------------------------------------

# Version History: None

#----------------------------------------

#----------------------------------------

# Environmental Variables

#----------------------------------------
# Constants
bar='========================================================= wire='=--------------------------------------'

Variables
numeric_date=$(date +%m%d%y)
text_date=$(date +%d%b)
typeset -i return_code
typeset -i merge_return_code
typeset -i retain_days=90
typeset -i in_retain_days
typeset -i copies
typeset -i ncrement
typeset -i mount_fs_test
invoked_name=$0
script_name=${invoked_name##*/}
user_id=$(whoami)
desc='ADSM Archive at'$text_date
level=0
```

FIG. 13B

```
# Process Control Variables
L_flag=0
L_flag=0
r_flag=0
d_flag=0
```

*FIG. 13C*

```
Files default_log_dir=/var/adm/scriptlogs
default_log_file=$script_name.$text_date
default_backup_device=/dev/rmt0.1
work_file1=/tmp/$script_name.$text_date.work1
work_file2=/tmp/$script_name.$text_date.work2
config_file=/etc/fscpbktab
audit_file=/etc/fscpbktab.audit
lock_file=/var/locks/fscpbktab

#------------------------------------

# Function: show_usage
Description: Displays command usage syntax and exits
Input: None
Output: Usage message to standard error
Return Value: 2
Note: This function does not return. It completely exits.

#------------------------------------
show_usage ()
{
    print -u2 "            "
    print -u2 "Usage: fscpbk_merge.ksh [-l directory] [-r days]"
    print -u2 "            "
    print -u2 "    -l directory    Log output directory."
    print -u2 "                    Default is" $default_log_dir
    print -u2 "            "
    print -u2 "    -r days         Log retention period."
    print -u2 "                    Default is" $retain_days
    print -u2 "            "
    exit 2
}

#------------------------------------

# Korn Shell Settings

#------------------------------------
#set -o errexit      # Turn on error trapping and error exit mode
#set -o noclobber    # Prevent overwriting of existing files
#set -o noexec       # Perform syntax checking without execution
```

```
#set -o nolog      # Prevents storing function defs in history file
#set -o xtrace     # Turn on debug mode

#----------------------------------------

# Main Routine

#----------------------------------------

# Test for any passed paramaters.
#if [ $? != 0 ]
#then
show_usage
fi

log_dir=$default_log_dir
# Parse Command Line Arguments into Variables
while getopts l:r# c
do
    case $c in
      l)  # Set up the -l flag
          l_flag=1
          log_dir=$OPTARG;;
      r)  # Set up the -r flag
          r_flag=1
          in_retain_days=$OPTARG;;
      :)  show_usage;;
      \?) show_usage;;
      esac
done
shift $((OPTIND-1))

Deal with invocation errors
if [[ $user_id != root ]]; then
    show_usage fi
fi

# Configure Logging
if [[ $l_flag -eq 1 ]]; then
    log_file=$in_log_dir/$default_log_file
    mkdir -p $in_log_dir 2>/dev/null    #Create new log directory
else
    log_file=$default_log_dir/$default_log_file
    mkdir -p $default_log_dir 2>/dev/null # Create default log directory
fi if [[ $r_flag -eq 1 ]]; then
    retain_days=$in_retain_days
fi
```

*FIG. 13D*

```
# Clear old logs
find $log_dir -name "$script_name*" -mtime $retain_days -exec rm {}\;

# Create new log file
exec 3>> $log_file  # Open log file for writing print -u3 "\n=================================================="
print -u3 "=                                                ="
print -u3 "=  Systems Management Transaction Log            ="
print -u3 "=                                                ="
print -u3 "=   Created by script:" $script_name
print -u3 "=        on system:" $(hostname)
print -u3 "=        at    :" $(date)
print -u3 "=                                                ="
print -u3 "=================================================="

Perform Work
#   Comments: NOTE!!: This script is an excerpt of the fscpbk_back.ksh
script. If that script is edited, this one
should probably be edited to match.

Test for existing table file
if [[ ! (-r $config_file) ]]; then
    print -u2 "Fatal Table error. Table file" $config_file "not found."
    print -u3 "Fatal Table error. Table file" $config_file "not found."
    exec 3<&-
    exit 99
fi

Test for existing table audit file
if [[ ! (-r $audit_file) ]]; then
    print -u2 "Fatal Table error. Table file check program must be run."
    print -u3 "Fatal Table error. Table audit file" $audit_file "not found."
    exec 3<&-
    exit 97
fi

Test for table file audit indicating syntax check since last edit current_Y=$(date +%Y)

audit_stamp=$( head -1 $audit_file | awk'{ print $1 }')

#  Check for colon and thus time instead of year on file datestamp
ntest=$(ls -l $config_file | awk'{ print $8 }' | grep : | wc -l)
if [[ $ntest -eq 1 ]]; then
    edit_year=$current_Y
```

FIG. 13E

```
else
    edit_year=$(ls -l $config_file | awk '{ print $8 }')
fi
```

FIG. 13F

```
edit_month_text=$(ls -l $config_file | awk '{ print $6 }')
edit_day=$(ls -l $config_file | awk '{ print $7 }'
edit_hour=$(ls -l $config_file | awk '{ print $8 }' | cut -f 1 -d :)
edit_minute=$(ls -l $config_file | awk '{ print $8 }' | cut -f 2 -d :)

# Determine month number from month name
case $edit_month_text in
Jan)    edit_month=01;;
Feb)    edit_month=02;;
Mar)    edit_month=03;;
Apr)    edit_month=04;;
May)    edit_month=05;;
Jun)    edit_month=06;;
Jul)    edit_month=07;;
Aug)    edit_month=08;;
Sep)    edit_month=09;;
Oct)    edit_month=10;;
Nov)    edit_month=11;;
Dec)    edit_month=12;;
*)      print -u2 "Fatal Table error. Table file date read error."
        print -u3 "Fatal Table error. Table file date read error."
        exec 3<&-
        exit 98;;
esac edit_stamp=$edit_year$edit_month$edit_day$edit_hour$edit_minute

Test for table file audited since last editing
if [[ $audit_stamp -le $edit_stamp ]]; then
    print -u2 "Fatal Table error. Table file edited since last checked."
    print -u3 "Fatal Table error. Table file edited since last checked."
    exec 3<&-
    exit 97
fi

# Table file format
# Format: bc:pfs:plv:c:afs:alv              =
xb:/home:hd1:2:/alt/home:/altlvh          =
```

```
ncrement=0
return_code=0
merge_return_code=0

# Cycle through filesystems and perform merges
for fs_line in $(cat $config_file | grep -v ~#)
do
    action=$(print $fs_line | cut -f 1 -d :)
    fs_prime=$(print $fs_line | cut -f 2 -d :)
    lv_prime=$(print $fs_line | cut -f 3 -d :)
    fs_alt=$(print $fs_line | cut -f 5 -d :)
    lv_alt=$(print $fs_line | cut -f 6 -d :)
    copies=$(print $fs_line | cut -f 4 -d :)
    target_fs=$fs_prime
    print -u3 $action $fs_prime $lv_prime $copies
    if [[ $action != no ]]; then

#       Merge split filesystems if mirrored
        if [[ $copies -gt 1 ]]; then
            merge_fs_copy.ksh -p $fs_prime -s $fs_alt
            merge_return_code=$merge_return_code+$?
        fi
    fi
done exec 3<&-

Test for unsuccessful filesystem merges
if [[ $merge_return_code -ne 0 ]]; then
    exit 20
fi

# Remove lock on table file
rm $lock_file 2>/dev/null
chmod 644 $config_file exit 0
```

*FIG. 13G*

ENHANCED BACKUP AND RECOVERY METHODOLOGY

BACKGROUND OF THE INVENTION

1. Technical Field

The present invention relates to information processing technology. More particularly, the present invention relates to providing means for improving the efficiency and reliability in backing up data.

2. Description of Related Art

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (m, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Disk failure is the most common hardware failure in the storage system, followed by failure of adapters and power supplies. Protection against disk failure primarily involves the configuration of the logical volumes. To protect against adapter and power supply failures, a popular configuration includes two adapters and at least one disk per adapter, with mirroring across adapters, without regard to the number of active blocks in the volume group. By mirroring the original data, copies are available in case of an interruption. Read efficiency is also improved because the logical volume manager is free to choose a less busy drive from which to read. RAID (redundant array of independent disks) is an alternative mirroring technique where data is striped block by (512-byte) block, but portions of several (not necessarily all) of the drives are set aside to hold parity information. This spreads the load of writing parity information more evenly.

In today's information systems (1S) environment, backup and recovery are frequently a subject of great complexity and, therefore, an area in which lapses may occur. For instance, on UNIX systems, file backup may be enacted via mksysb (accomplished directly by the operating system), via specialized backup and recovery software, such as ADSM (ADSTAR distributed storage network (ADSTAR is a registered trademark of IBM)), available from IBM, or via some method built directly into an application for backing up its own data sets. Quite often, administrators are familiar with the usage of these divergent techniques and, accordingly, enact multiple backup methods on a given system within a finite and regularly scheduled timeframe. The result is a chaotic backup plan, which requires great planning and care to ensure that all necessary filesystems are backed up in a timely and thoughtful manner.

Typically, backup is accomplished using either a "one size fits all" approach, where all data needs are subject to the same backup method. Alternatively, the administrator grapples with the management of various tools in an ad hoc manner. Neither process is an efficient use of the system administrator's time nor does either provide adequate backup results for the systems under the administrator's control.

It would be advantageous to provide a framework for a more efficient means for backing up data using diverse techniques. It would also be advantageous to provide a means for reducing the reliance on the skill level of the system administrator for implementing system backups. It would be further advantageous to provide a more automated means for backing up systems, thereby relieving the system administrator of some of the time constraints involving system backup. Additionally, it would be advantageous to provide system administrators with an easy-to-use and flexible backup tool that allows administrators to backup systems anytime, regardless of system usage.

SUMMARY OF THE INVENTION

The present invention relates to a system and method for the automated backing up of filesystems. Initially, a table file is built which lists at least the filesystems to be backed up. It also may list the type of backup techniques to be used for a specific filesystem, the filesystem's logical location, and the number of copies to be made. The table file is checked for syntax and is then available for other routines. An automated script may be used for building the table, and then it may be manually edited if necessary.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart depicting the process for backing up filesystems using the backup selection table file created in FIG. 4;

FIGS. 7A–7E depict a script called "fscpbktab_unlock.ksh", which will remove locks on the table file that prevent various backup operations from interfering with each other;

FIGS. 8A–8G depict a script called "fscpbktab_build.ksh", which will build the table file based on an inventory of the filesystems actually present;

FIGS. 9A–9G depict a script called "fscpbktab_check.ksh", which will check the table file for syntax and content errors;

FIGS. 10A–10E depict a script called "fscpbk_sync.ksh", which will detect mirrored logical volumes where mirrored partitions in the logical volume are stale;

FIGS. 11A–11H depict a script called "fscpbk_select.ksh" that will parse the table file and select filesystems for backup;

FIGS. 12A–12J depict a script called "fscpbk_back.ksh" that will parse the table file and perform the actual backup of filesystems; and FIGS. 13A–13G depict a script called "fscpbk_merge.ksh" that will parse the table file and merge those filesystems that have been split into separate primary and alternate filesystems.

DETAILED DESCRIPTION OF THE PREFERRED EMBODIMENT

Figure 1:
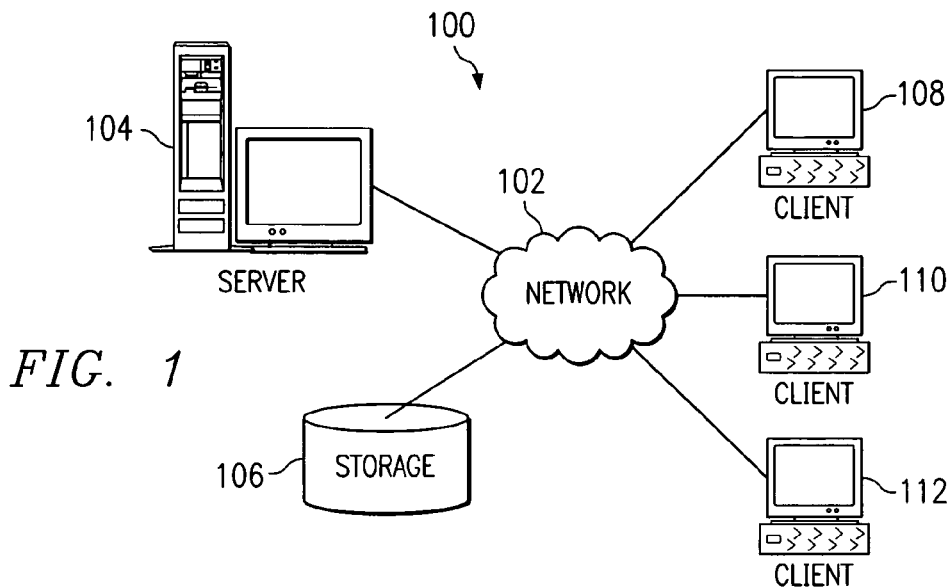
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
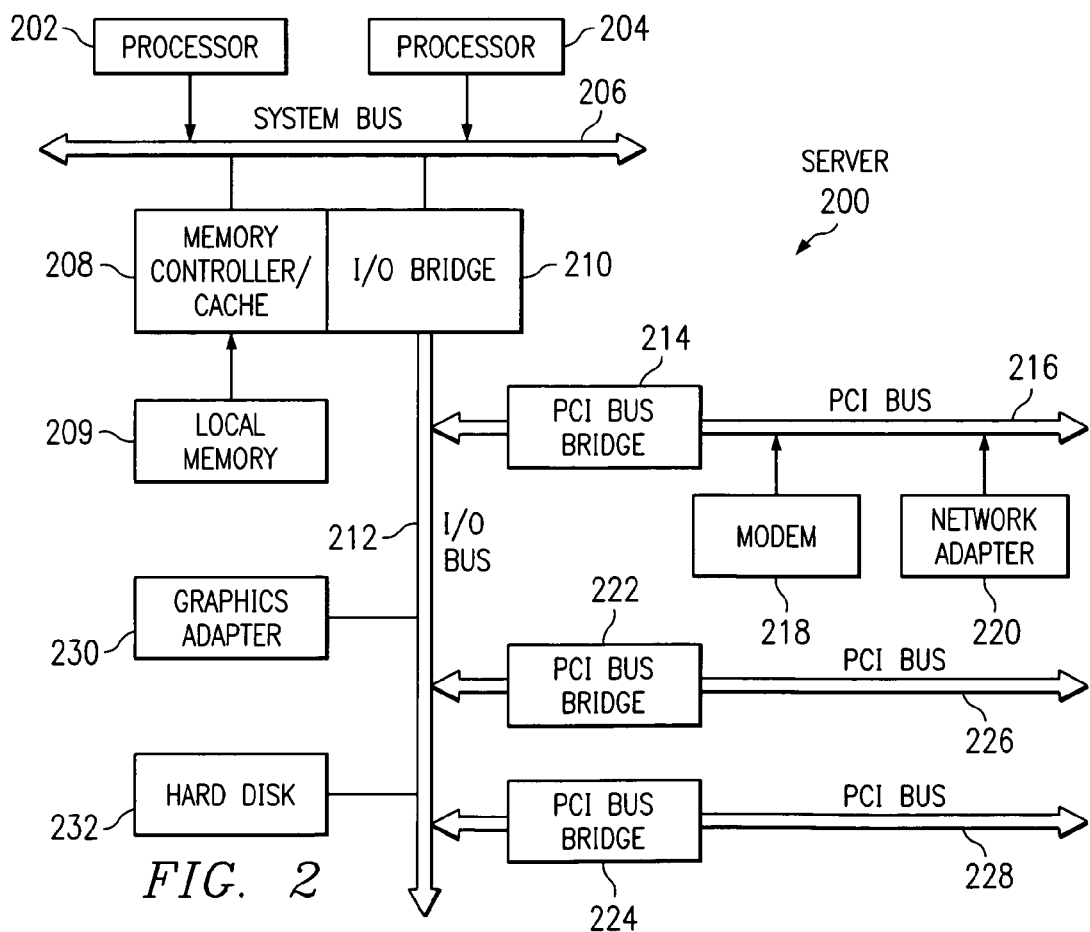
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Figure 3:
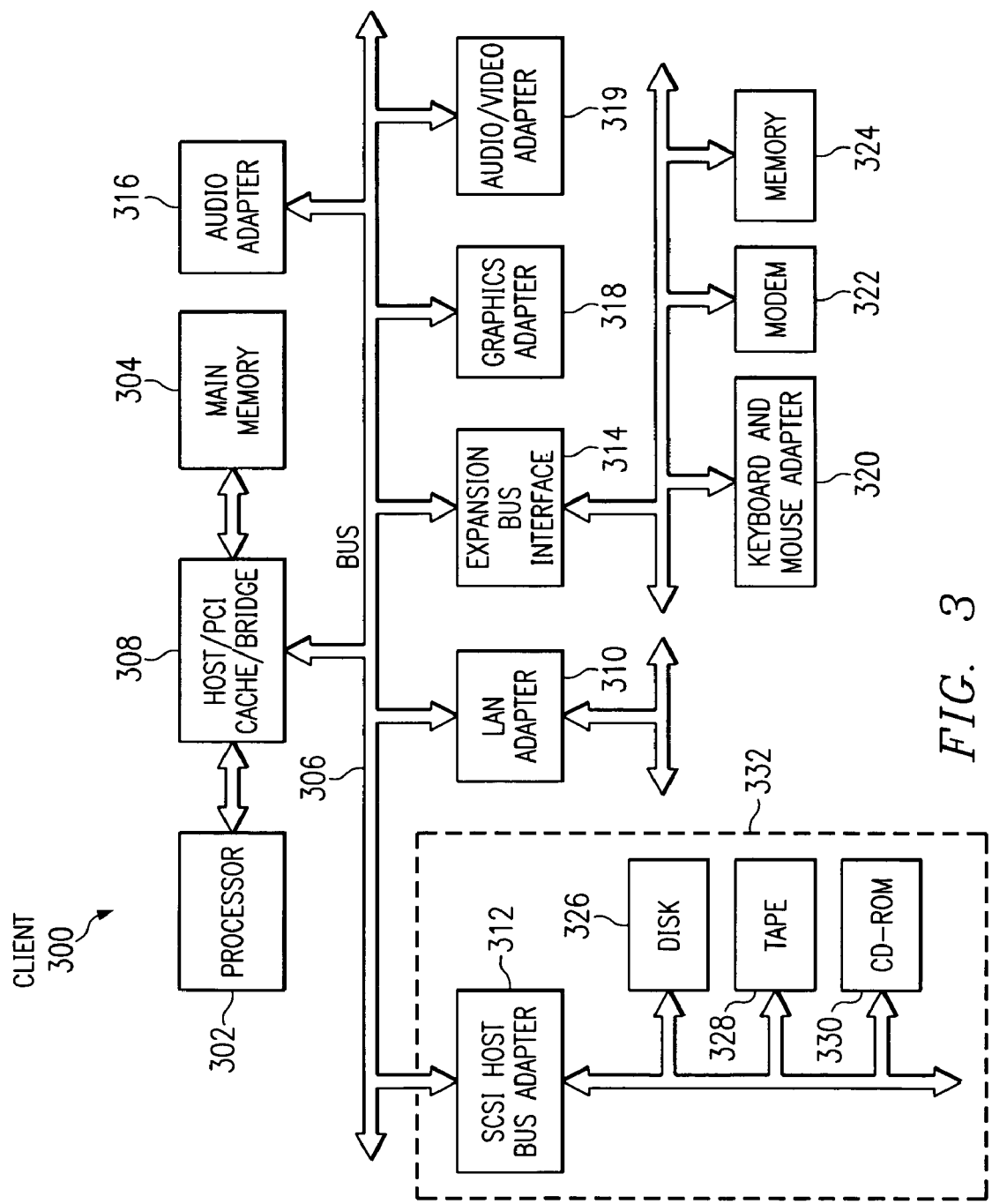
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

As discussed above, system administrators are faced with the task of being very familiar with a number of diverse backup methodologies in order to implement a coherent system for backing up the filesystems under the administrator's care. Often, administrators must be familiar with the usage of these divergent techniques and, accordingly, enact multiple backup methods on a given system within a finite and regularly scheduled time frame. This situation may lead to system administrators delaying backing up systems which the administrator is less familiar and/or is more difficult to implement due the uniqueness of the system backup scheme.

Introduced into this environment, an ideal backup tool would be one that permits the operation of different backup utilities and allows them to be controlled from a single point of interaction. Furthermore, besides providing a concentration of diverse methods beneath the same control mechanism, an exemplary backup tool would also create a master list of filesystems to be backed up automatically; it would allow the administrator to select specific backup methodologies for each filesystem (or even exempt filesystems from backup); and it would perform an audit function to ensure that the administrator does not inadvertently corrupt the control file during such modifications.

A preferred embodiment of the present invention, as manifested in the discussion and figures below, provides a single point of administration for diverse backup methodologies, and it automatically creates and audits backup control tables. It also permits administrator customization to exempt or modify filesystem specifics. Furthermore, the enhanced backup and recovery system detailed herein can also work with mirrored filesystems, taking one copy offline to make backups and then re-merging the mirror when the backup is complete. A preferred embodiment of the present invention may, in varying degrees, be applicable to and extendible across a variety of operating systems. Therefore, the implementation of an automating method for filesystem backup of the preset invention is not limited to AIX or UNIX type operating systems but, instead, may be incorporated into any type of operating system. However, the exemplary embodiment described herein resides on a UNIX system; therefore, the description of this implementation pertains particularly to such computer systems.

An important feature of the present invention is the building of a backup selection table file or configuration table. This table file (in colon-delimited format similar to the /etc/inittab file) indicates which filesystems are to be backed up. For filesystems on mirrored logical volumes, it will indicate what to name the temporary filesystems and logical volumes that result from the split. In accordance with a preferred embodiment of the present invention, the filesystem backup selection table file may be formatted as:

bc:pfs:plv:c:afs:alv where, "bc" (Backup Control) is one of the following:

xb->AIX Backup (Level 0 AIX FS Backup)
no->No Backup (Skip filesystem)
as->ADSM Selective Backup
ai->ADSM Incremental Backup
aa->ADSM Archive The backup control tells the system which backup technique to use for the filesystem designated on that table command line. "pfs" (Primary Filesystem) is the full path of the standard filesystem, and "plv" (Primary Logical Volume) is the AIX LV name of the logical volume containing the primary filesystem. "c" (Copies) relates to the number of AIX LVM copies of the logical volume containing the primary filesystem. The copy number must be numeric 1, 2 or 3 for AIX filesystems; however, other flavors of UNIX may support more or fewer copies. "afs" (Alternate Filesystem) is the full path of the mirror copy filesystem and must be unique. "alv" (Alternate Logical Volume) is the AIX LV name of the logical volume containing the alternate filesystem and must also be unique. An example of a mirrored home filesystem to be backed up using an AIX backup command:

xb:/home:hd1:2:/alt/home:altlvh

Each command line relates to a separate filesystem to be backed up, specifying the backup technique, the physical and logical locations of the filesystem, the number of mirror copies present for the logical volume and, finally, the physical and logical location where the copies are to be located once they are made. An administrator may, at any time, edit any line on the backup selection table file, or may instead edit the entire table. However, during backing up operations where the table file is being used in a backup process, the table is locked in order to avoid conflict between backup operations. Unlocking the table is possible for troubleshooting or fixing a problem with a backup operation. The table file uses a two stage lock to prevent inadvertant modification of the file and the resulting possible disruption of backup operations. The first stage of the lock is the use of a separate lock file. The presence or absence of the lock file is used by the constituent programs to signal whether it is safe or appropriate to modify or manipulate the table file itself. The second stage of the lock is the manipulation of file access permissions on the table file itself. During key periods, the table file permissions are set to prevent any other users or outside processes from reading, editing, deleting, or otherwise manipulating the table file. During safe periods, the table file permissions are returned to nominal settings. Syntax is crucial to the proper parsing of the table file, so, in a preferred embodiment of the present invention, syntax must be checked before any script will accept data in the table file for processing.

In a preferred embodiment of the present invention, for the mirrored filesystems, it will be the temporary filesystems that are backed up, meaning that the backups will contain the names of the filesystems and directories of the temporary (alternate) filesystem, not the primary (active) filesystem. The table file (created by the "fscpbktab_build.ksh" script below) is self documenting.

Figure 4:
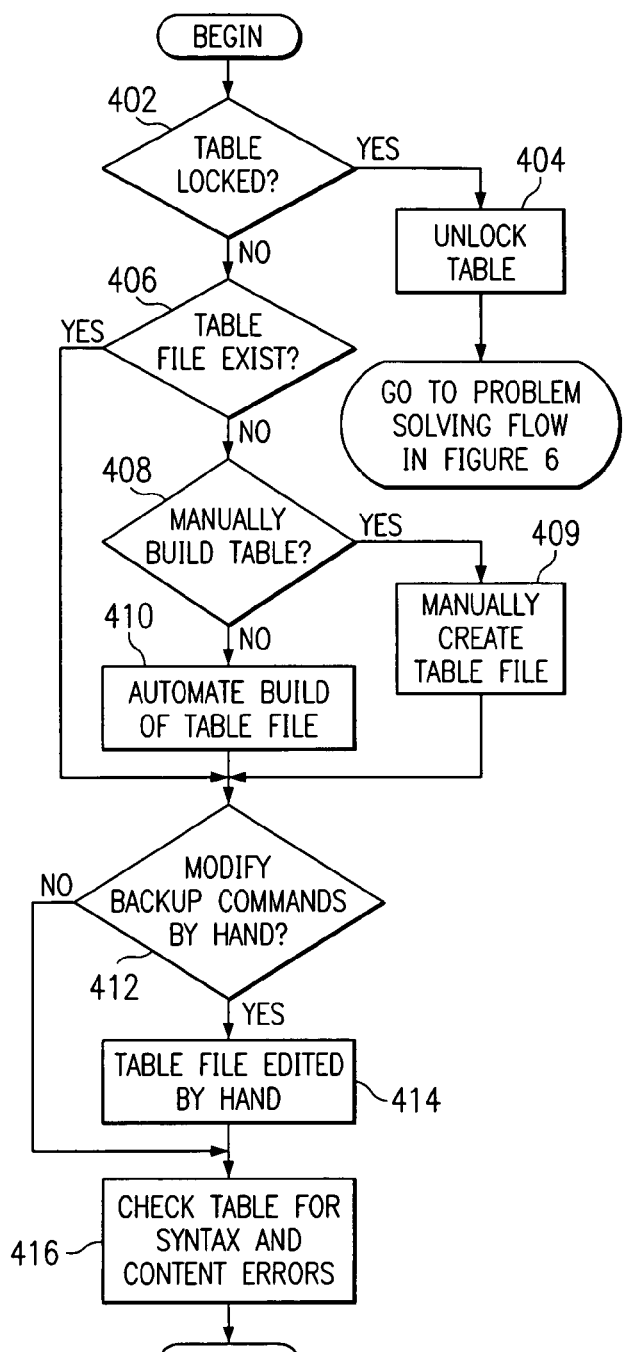
FIG. 4 is a flowchart of a process for building a table file.

A flowchart depicting a process for building and managing a table file is depicted in FIG. 4. The process begins with the table file being tested for accessibility (step 402). If the table is locked, it is assumed that the backup process is currently underway and that it is not desired to change the table file and confuse backup operations in progress. It is also possible that the table file may remain locked in the event of a backup problem or hang state. In that case, the system administrator needs to be able to resolve the problem and release the table lock condition before the next backup operation. Therefore, the table file must be unlocked, allowing the system administrator access to the table file and other backup operations to be performed subsequent to the administrator fixing the bug (step 404). Unlocking the table involves a number of steps for updating error logs and checking syntax for active commands within the table.

While it is possible to manually perform each of the steps in unlocking the table file, there is a high probability that additional errors may be created by manually unlocking the table. Therefore, in accordance with a preferred embodiment of the present invention, a script called "fscpbktab_unlock.ksh" is show in FIGS. 7A through 7E. Returning to step 404 in FIG. 4, the process proceeds to the problem solving phase depicted in FIG. 6 below.

Returning to step 402, assuming that a locked table is not found, the administrator may proceed with building or editing the table. First, it must be determined if a table is in existence (step 406). If a table file exists, the process flows to step 412, where a decision is made whether or not to edit the table. Returning to step 406, if no table file exists, a decision is made whether to manually build the table (step 408). If the decision is made to manually build the table file, then the table file is manually created (step 419) and the process again returns to step 412; otherwise, the table is built by invoking an automated table building script (step 410).

In accordance with a preferred embodiment of the present invention, an automated table building script "fscpbktab_build.ksh" is shown in FIGS. 8A through 8G. This script automatically builds the table file based on an inventory of the filesystems actually present. A default backup method will be the AIX command "backup by i-node," and will be set for each present filesystem. Once a table file has been built, the process again flows to step 412, where a decision is made whether the system administrator is to edit the table file.

If the administrator intends to edit the table by hand, the process flows to step 414, where the editing is performed. Editing the table file may include actions such as selecting which filesystems to backup, deselecting filesystems not to backup, changing the backup technique, or designating a new unique path for a copy. Returning to step 412, if no hand entry is needed, the table file is checked for syntax and context errors (step 416).

An error free table is crucial for successfully backing up the filesystems; therefore, a script has been developed for automatically checking the table file following entries in the table. In accordance with a preferred embodiment of the present invention, a next script called "fscpbktab_check.ksh" is shown in FIGS. 9A through 9G. This script checks the table file for syntax and content errors. The system administrator may use this script to check the table file after it has been automatically built or hand edited. Importantly, any scripts that use the table file will check the table file for syntax checking prior to using the file. If a script determines that a table file has been edited subsequent to the last syntax check, the script will not use the table file but will issue an error.

Once a syntax-free table file is available for the system, the administrator may invoke the backup tool for automatically backing up filesystems. Therefore, the backup tool for backing up the filesystems may be invoked anytime thereafter. An important benefit of the present invention is that all of the criteria needed for backing up the filesystems have been pre-assembled for the system administrator in the table file. The administrator is freed from the tedious tasks associated with determining which filesystems to back up and determining an appropriate backup method for each filesystem, as well as performing the checks and validations needed to ensure compliance with a specific operating system. By tabulating the criteria needed for backing up filesystems in a script-usable form, the present invention gives the system administrator the flexibility to perform a backup operation any time it is convenient for the system administrator.

FIG. 5 is a flowchart depicting the process for backing up filesystems using the backup selection table file created in FIG. 4 above. The process begins by synchronizing the mirrored logical volumes (step 502). Because stale partitions must be updated prior to backing up the system, the first step is to sync or re-sync the entire system, thereby eliminating any potential problems related to backing up stale data. In accordance with a preferred embodiment of the present invention, a next script called "fscpbk_sync.ksh" is shown in FIGS. 10A through 10E. The depicted script will detect mirrored logical volumes where mirrored partitions in the logical volume are stale. Stale logical volumes will be resynchronized and, thus, ready for backing up if they are selected for backup. When invoked, fscpbk_sync.ksh re-syncs all stale logical volumes without regard to the filesystems specified in the backup selection table file.

Returning to the process depicted in FIG. 5, a check is made to determine if applications are presently running (step 504). This is depicted in the present embodiment as a separate step, because there might be some occasions when the data structure table file is relatively uncomplicated and the system administrator may perform backup operations with some confidence that the filesystems to be backed up are not being accessed or modified at backup time. In that case, the system administrator merely calls the table file (step 516), selects filesystems to backup (step 518), splits any mirrored filesystems (step 520) and backs up the filesystems using the table file (step 518).

However, as discussed above, an important advantage of the present invention is to relieve the system administrator of the burden of having to manually backup selected filesystems. Therefore, a preferred embodiment of the present invention is depicted in a script called "fscpbk_back.ksh" shown in FIGS. 12A through 12J. This script parses the table file and performs the actual filesystem backups. If applicable, it also merges those filesystems that have been split into separate primary (active) and alternate (inactive) filesystems. This script returns various error codes if it is unable to locate the table file or the filesystems, and/or if it is unable to backup or merge the filesystems. fscpbk_back.ksh performs the filesystem backup by first calling the table file; thus, the system administrator is relieved of having to perform step 516.

Returning to step 504, in many cases the system administrator may not know for certain that a filesystem to be backed up will not be used during the time that the filesystem is being backed up. Filesystems that are available twenty-four hours a day are particularly difficult to schedule. Therefore, an administrator may instead freeze the running applications (step 506) and call the table file (step 508). The administrator then determines which filesystems to back up (step 510). Practically speaking, because fscpbk_back.ksh actually performs the filesystem backing up, what is being selected are filesystems which cannot safely be backed up in their present state, such as mirrored filesystems which are available twenty-four hours a day or are presently frozen.

The system administrator splits all mirrored filesystems that might be in use at backup time, including the frozen filesystems (step 512).

In accordance with a preferred embodiment of the present invention, a script called "fscpbk_select.ksh" is shown FIGS. 13A through 13G. This script automatically parses the table file and selects filesystems that must be split for backup. Most importantly, it will split those filesystems that are mirrored into separate primary (active) and alternate (inactive) filesystems. This script will return various error codes if it is unable to locate the table file or the filesystems, and/or if it is unable to split the filesystems. By invoking fscpbk_select.ksh, steps 508, 510 and 512 are automatically performed by the script and, thus, the administrator is freed from those tasks. Furthermore, fscpbk_select.ksh accesses the table file for the name of the temporary filesystems and logical volumes that result from the split.

Returning to FIG. 5, frozen applications are thawed and allowed to continue at the point where they were frozen (step 514). The process can be further automated by devising script which looks for running applications, freezes them at a convenient point in their process cycle, calls and executes the fscpbk_select.ksh script and, once fscpbk_select.ksh returns the split filesystems, thaws the frozen file. One of ordinary skill in the art could easily create such a script using the above description of its functionality.

Once all filesystems are in condition (mirrored filesystems split) for backing up, the system administrator can proceed with the backup operation at any time (step 520). Again, the script fscpbk_back.ksh may be employed for automatically backing up the filesystems. The process then ends with the filesystems being backed up.

Figure 6:
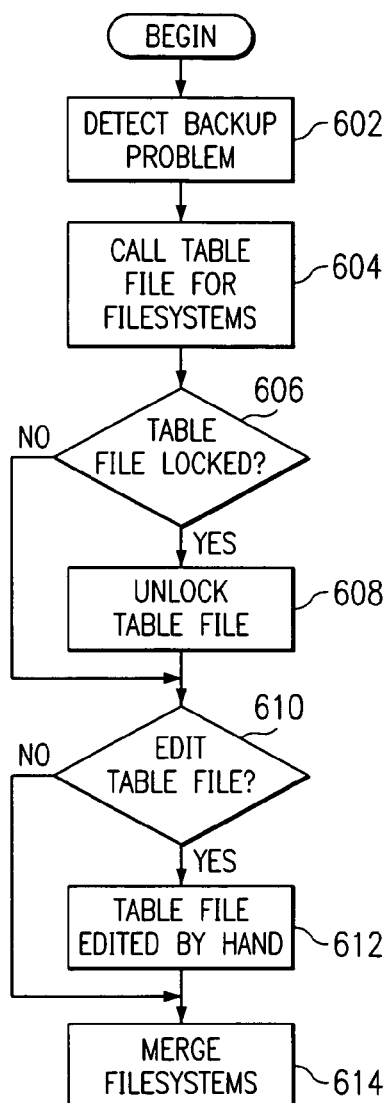
FIG. 6 is a flow chart depicting a process for resolving a backup problem when using a backup selection table file in accordance with a preferred embodiment of the present invention.

As alluded to above, when a problem occurs in the backup operation, the backup selection table file is most probably in need of editing. FIG. 6 is a flowchart depicting a process for resolving a backup problem when using a backup selection table file in accordance with a preferred embodiment of the present invention. The process begins with the detection of a backup problem (step 602). The system administrator may then call the table file (step 604) and determine if it is locked (step 606). If not, the process flows to step 610, where a determination is made whether the table file needs editing. On the other hand, if the table file is locked, it may be unlocked using the script fscpbktab_unlock.ksh as described above (step 608). The table file might also be manually unlocked.

Next, the determination is made as to whether the table file needs editing (step 610). If the table file does not need to be edited, the process flows to step 614, where any split filesystems that are present are merged, thus allowing the backup process on those filesystems to continue at a later time. Returning to step 610, it is generally assumed that the table file itself may either contain an error or that a problematic backup operation might need to be temporarily unselected while the backup problem is being studied. This allows other backups to continue. If so, the table file is edited (step 612). Once the table file has been edited, the process flows to step 614, where the split filesystems are merged, allowing the backup process on those filesystems to continue at a later time.

Below are descriptions of preferred embodiments of scripts used in describing the present invention.

Referring to FIGS. 7A through 7E, a script called "fscpbktab_unlock.ksh" removes locks on the table file that prevent various backup operations from interfering with each other. This script is generally only used for diagnostic or problem solving purposes.

Referring to FIGS. 8A through 8G, a script called "fscpbktab_build.ksh" builds the table file based on an inventory of the filesystems actually present. The system administrator may then edit the table file to select which filesystems to backup or not to backup. The default backup method will be the AIX command "backup by inode." The backup usually creates what is called an AIX "stacked tape."

Referring to FIGS. 9A through 9G, a script called "fscpbktab_check.ksh" will check the table file for syntax and content errors. The system administrator may use this script to check the table file after it has been edited, to select which filesystems to backup.

Referring to FIGS. 10A through 10E, a script called "fscpbk_sync.ksh" will detect mirrored logical volumes where mirrored partitions in the logical volume are stale. Stale logical volumes will be resynchronized.

Referring to FIGS. 11A through 11H, a script called "fscpbk_select.ksh" will parse the table file and select filesystems for backup. Most importantly, it will split those filesystems that are mirrored into separate primary (active) and alternate (inactive) filesystems. This script will return various error codes if it is unable to locate the table file, the filesystems, and/or is unable to split the filesystems.

Referring to FIGS. 12A–12J, a script called "fscpbk_back.ksh", will parse the table file and perform the actual backup of filesystems. It will also merge those filesystems that have been split into separate primary (active) and alternate (inactive) filesystems. This script will return various error codes if it is unable to locate the table file or the filesystems, and/or if it is unable to backup or merge the filesystems.

Referring to FIGS. 13A through 13G, a script called "fscpbk_merge.ksh" will parse the table file and merge those filesystems that have been split into separate primary and alternate filesystems. This merge action is performed without backing up any data. This script is generally used only for diagnostic or problem solving purposes.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for automating a filesystem backup process, comprising:
   building a table file, wherein the table file lists filesystems to be backed up;
   specifying, within said table file, one of a plurality of different backup utilities for each of said filesystems listed in said table file, said table file including different backup utilities being specified;

accessing the table file; and executing one of said plurality of different backup utilities to backup a filesystem listed in the table file wherein said one of said plurality of different backup utilities is specified for said filesystem, further wherein different backup utilities are specified within said table file.

2. The method recited in claim 1, wherein the table file further comprises a logical location of the filesystem to be backed up.

3. The method recited in claim 1, wherein the table file further comprises a logical location for at least one backup copy.

4. The method recited in claim 1, wherein the table file further comprises a number of copies to be created.

5. The method recited in claim 1, further comprising, prior to backing up the filesystem, splitting the filesystem on the basis of the filesystem being in use during backing up the filesystem.

6. The method recited in claim 1, further comprising, prior to backing up the filesystem, locking the table file.

7. The method recited in claim 6, further comprising:
detecting an error in backing up the filesystem;
unlocking the table file; and
editing the table file.

8. The method recited in claim 1, further comprising, prior to backing up the filesystem, re-syncing logical volumes servicing the filesystems.

9. The method recited in claim 1, wherein building a table file is performed by an automated script.

10. The method recited in claim 1, wherein accessing a table file is a function performed by an automated script.

11. The method recited in claim 1, wherein said step of executing said one of said plurality of backup utilities to back up the filesystem is performed by an automated script.

12. The method recited in claim 7, wherein unlocking the table file is performed by an automated script.

13. The method recited in claim 8, wherein re-syncing logical volumes is performed by an automated script.

14. The method recited in claim 5, wherein splitting the filesystem is performed by an automated script.

15. A data processing system for automating a filesystem backup process, comprising:
building means for building a table file, wherein the table file lists filesystems to be backed up;
specifying means for specifying, within said table file, one of a plurality of different backup utilities for each of said filesystems listed in said table file, said table file including different backup utilities being specified;
accessing means for accessing the table file; and
executing means for executing one of said plurality of different backup utilities to backup a filesystem listed in the table file wherein said one of said plurality of different backup utilities is specified for said filesystem, further wherein different backup utilities are specified within said table file.

16. The system recited in claim 15, wherein the table file further comprises a logical location of the filesystem to be backed up.

17. The system recited in claim 15, wherein the table file further comprises a logical location for at least one backup copy.

18. The system recited in claim 15, wherein the table file further comprises a number of copies to be created.

19. The system recited in claim 15, further comprising:
splitting means for splitting the filesystem on the basis of the filesystem being in use during backing up the filesystem.

20. The system recited in claim 15, further comprising:
locking means for locking the table file.

21. The system recited in claim 20, further comprising:
detecting means for detecting an error in backing up the filesystem;
unlocking means for unlocking the table file; and
editing means for editing the table file.

22. The system recited in claim 15, further comprising:
re-syncing means for re-syncing logical volumes servicing the filesystems.

23. The system recited in claim 15, the building means for building a table file is an automated script.

24. The system recited in claim 15, wherein the accessing means for accessing a table file is by an automated script.

25. The system recited in claim 15, wherein said executing means for executing said one of said plurality of backup utilities to back up the filesystem is an automated script.

26. The system recited in claim 21, wherein the unlocking means for unlocking the table file is an automated script.

27. The system recited in claim 22, wherein the re-syncing means for re-syncing logical volumes is an automated script.

28. The system recited in claim 19, the splitting means for splitting the filesystem is an automated script.

29. A data processing system implemented computer program product for automating a filesystem backup process, comprising:
building instructions for building a table file, wherein the table file lists filesystems to be backed up;
specifying instructions for specifying, within said table file one of a plurality of different backup utilities for each of said filesystems listed in said table file, said table file including different backup utilities being specified;
accessing instructions for accessing the table file; and
executing instructions for executing one of said plurality of different backup utilities to backup a filesystem listed in the table file wherein said one of said plurality of different backup utilities is specified for said filesystem, further wherein different backup utilities are specified within said table file.

30. The method according to claim 1, further comprising the step of specifying one of a plurality of different backup utilities for each of said filesystems listed in said table file, said plurality of different backup utilities including an AIX backup.

31. The method according to claim 1, further comprising the step of specifying one of a plurality of different backup utilities for each of said filesystems listed in said table file, said plurality of different backup utilities including an ADSM selective backup.

32. The method according to claim 1, further comprising the step of specifying one of a plurality of different backup utilities for each of said filesystems listed in said table file, said plurality of different backup utilities including an ADSM incremental backup.

33. The method according to claim 1, further comprising the step of specifying one of a plurality of different backup utilities for each of said filesystems listed in said table file, said plurality of different backup utilities including an ADSM archive.

34. The method according to claim 1, further comprising the steps of:
including a first filesystem and a second filesystem within said table file;
specifying a first backup utility for backing up said first filesystem; and
specifying a second backup utility for backing up said second filesystem, wherein said first backup utility is different from said second backup utility.

* * * * *